(12) United States Patent  
Skinder et al.

(10) Patent No.: US 9,080,878 B2  
(45) Date of Patent: Jul. 14, 2015

(54) AUTOMATIC IDENTIFICATION OF VEHICLE LOCATION

(71) Applicant: Apple Inc., Cupertino, CA (US)

(72) Inventors: Jason A. Skinder, Cupertino, CA (US); Stephen O. Lemay, Palo Alto, CA (US); Bradford A. Moore, San Francisco, CA (US); Seejo K. Pylappan, Cupertino, CA (US); Christopher Blumenberg, San Francisco, CA (US); Marcel van Os, San Francisco, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 13/773,481

(22) Filed: Feb. 21, 2013

(65) Prior Publication Data

US 2014/0232569 A1 Aug. 21, 2014

(51) Int. Cl.
| | | |
|---|---|---|
| G05B 15/00 | (2006.01) | |
| G01C 21/20 | (2006.01) | |
| G01C 21/16 | (2006.01) | |
| G08G 1/14 | (2006.01) | |
| G08G 1/005 | (2006.01) | |
| G08G 1/137 | (2006.01) | |

(52) U.S. Cl.
CPC .............. *G01C 21/20* (2013.01); *G01C 21/16* (2013.01); *G08G 1/144* (2013.01); *G08G 1/005* (2013.01); *G08G 1/137* (2013.01); *G08G 1/14* (2013.01)

(58) Field of Classification Search
CPC ....................................................... G08G 1/14

USPC .......... 340/932.2, 991, 988; 705/14.1, 32, 13; 342/357.2, 457

See application file for complete search history.

(56) References Cited

U.S. PATENT DOCUMENTS

| | | | |
|---|---|---|---|
| 5,416,712 | A | 5/1995 | Geier et al. |
| 6,405,125 | B1 | 6/2002 | Ayed |
| 6,407,698 | B1 * | 6/2002 | Ayed ........................ 342/357.31 |
| 6,429,791 | B2 | 8/2002 | Quinn |
| 6,909,964 | B2 | 6/2005 | Armstrong et al. |
| 6,982,669 | B2 | 1/2006 | Coatantiec et al. |
| 7,369,061 | B1 | 5/2008 | Sellers et al. |
| 7,688,226 | B2 * | 3/2010 | McCall .......................... 340/991 |
| 7,847,709 | B2 | 12/2010 | McCall et al. |

(Continued)

FOREIGN PATENT DOCUMENTS

| | | |
|---|---|---|
| EP | 2474943 A1 | 7/2012 |
| EP | 1 332 336 B1 | 10/2012 |

OTHER PUBLICATIONS

U.S. Appl. No. 13/772,978, filed Feb. 21, 2013 for Varoglu.

(Continued)

*Primary Examiner* — Brent Swarthout
(74) *Attorney, Agent, or Firm* — Kilpatrick Townsend & Stockton LLP

(57) ABSTRACT

A mobile computing device can be used to locate a vehicle parking location. In particular, the mobile device can automatically identify when a vehicle in which the mobile device is located has entered into a parked state. The mobile device can determine that the vehicle is in a parked state by analyzing one or more parameters that indicate a parked state or a transit state. The location of the mobile device at a time corresponding to when the vehicle is identified as being parked can be associated with an identifier for the current parking location.

24 Claims, 10 Drawing Sheets

(56) References Cited

U.S. PATENT DOCUMENTS

| | | |
|---|---|---|
| 8,112,251 B2 | 2/2012 | Case, Jr. et al. |
| 2006/0111835 A1* | 5/2006 | Baker et al. ................. 701/207 |
| 2006/0208568 A1* | 9/2006 | Kaita et al. ................. 307/9.1 |
| 2006/0267799 A1 | 11/2006 | Mendelson |
| 2007/0126603 A1 | 6/2007 | Driscoll et al. |
| 2009/0091477 A1* | 4/2009 | McCall et al. ............... 340/990 |
| 2009/0309759 A1 | 12/2009 | Williams |
| 2010/0318293 A1 | 12/2010 | Brush et al. |
| 2011/0032105 A1 | 2/2011 | Hoffman et al. |
| 2011/0093583 A1 | 4/2011 | Piemonte et al. |
| 2011/0239026 A1 | 9/2011 | Kulik |
| 2012/0197588 A1 | 8/2012 | Lee et al. |
| 2013/0096817 A1 | 4/2013 | Fauci et al. |
| 2013/0099892 A1 | 4/2013 | Tucker et al. |
| 2013/0103200 A1 | 4/2013 | Tucker et al. |
| 2014/0028477 A1* | 1/2014 | Michalske ................. 340/990 |
| 2014/0136103 A1* | 5/2014 | Korn et al. ................. 701/491 |
| 2014/0232570 A1 | 8/2014 | Skinder et al. |

OTHER PUBLICATIONS

U.S. Appl. No. 13/773,546, filed Feb. 21, 2013 for Skinder et al.
Kwapisz, Jennifer R., et al., "Activity Recognition Using Cell Phone Accelerometers," SensorKDD '10, Jul. 25, 2010, Washington, D.C., USA, 9 pages.
International Search Report and Written Opinion for International PCT Application No. PCT/US2014/012667, mailed Apr. 22, 2014, 9 pages.
International Search Report and Written Opinion for International PCT Application No. PCT/US2014/012669, mailed Apr. 22, 2014, 9 pages.
Non-Final Office Action for U.S. Appl. No. 13/773,546, mailed Jul. 25, 2014, 11 pages.

\* cited by examiner

AUTOMATIC IDENTIFICATION OF VEHICLE LOCATION

BACKGROUND

The present disclosure generally relates to marking the location of a vehicle, and more specifically to determining when a vehicle has entered a parked state and marking the location of the parking spot.

Mobile computing devices, such as smart phones, tablet computers, media players, and the like, have become ubiquitous. People are ever more reliant on mobile devices for their day-to-day activities. Mobile devices often have the ability to determine the location of the device. This ability has allowed the user of a mobile device to locate various places of interest with location-based services.

People use vehicles, such as automobiles, motorcycles, scooters, bicycles, and other transportation vehicles, for commuting and other transit needs. Locating suitable parking can be difficult, especially in densely populated urban areas. Even after a parking spot has been located for a vehicle, it can be difficult to remember the location of the parking spot. In some instances, parking areas (e.g., parking garages or bike racks) can have hundreds or thousands of vehicles parked at them. Some parking areas have multiple levels (e.g., $1^{st}$ Floor, $2^{nd}$ Floor, etc.) or sections (e.g., 100A or 17 Blue) that are difficult to differentiate and remember. As a result, time is lost looking for parked vehicles.

Embodiments of the invention address this and other problems both individually and collectively.

SUMMARY

In some embodiments, a mobile computing device can be used to locate a vehicle parking location in weak location signal scenarios (e.g., weak, unreliable, or unavailable GPS). For example, the mobile device can determine when a vehicle in which the mobile device is located has entered into a parked state. GPS or other primary location technology may be unavailable at the time the mobile device entered into a parked state (e.g., inside a parking structure). The location of the mobile device at a time corresponding to when the vehicle is identified as being parked can be determined using the first location technology as supplemented with sensor data of the mobile device. After the location of the mobile device at a time corresponding to when the vehicle is identified as being parked is determined, the determined location can be associated with an identifier for the current parking location.

Other embodiments are directed to systems, mobile devices, and computer-readable media associated with methods described herein. A better understanding of the nature and advantages of the present invention may be gained with reference to the following detailed description and the accompanying drawings.

DETAILED DESCRIPTION

Figure 1:
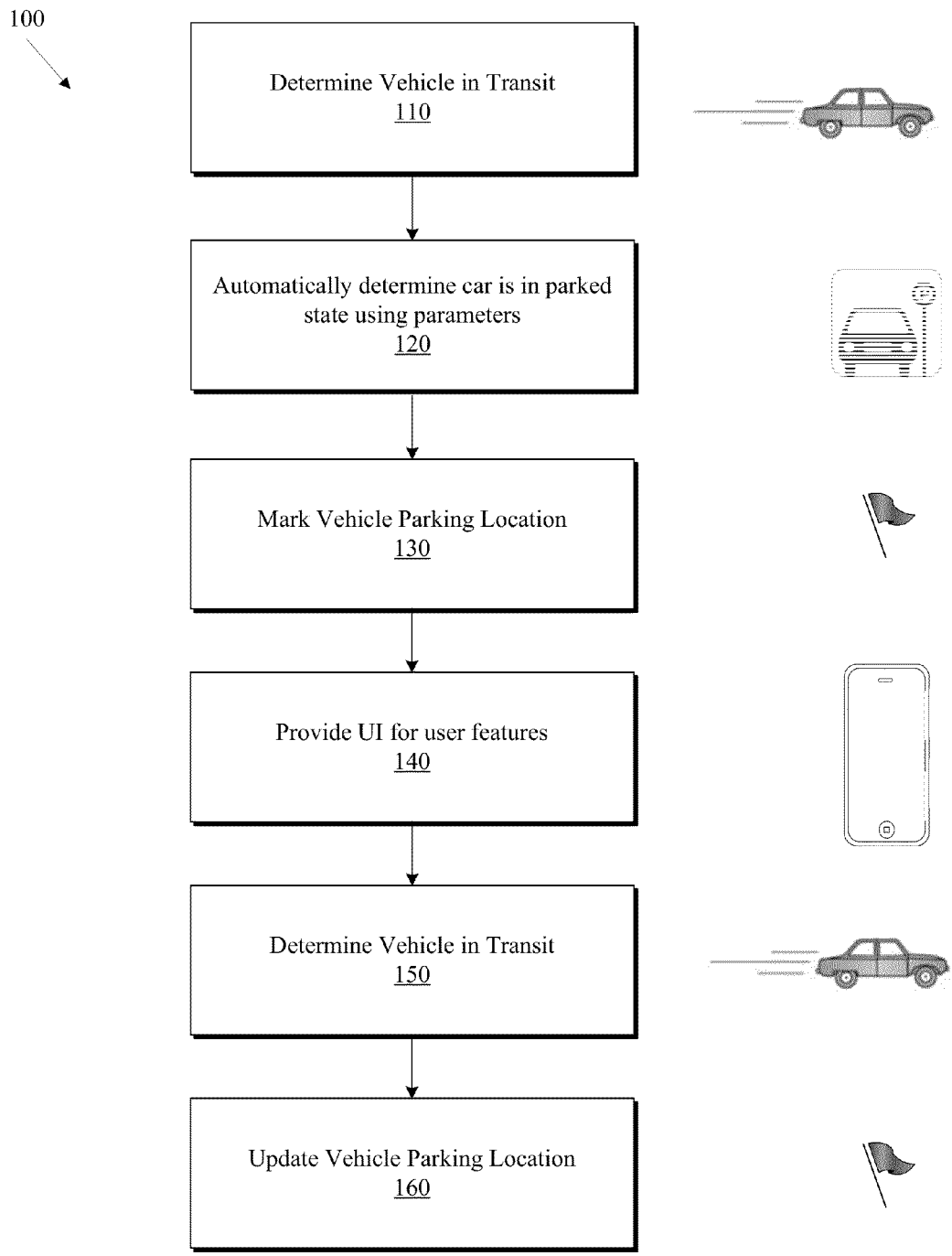
FIG. 1 is a flow diagram of a process usable by a mobile device to locate a vehicle according to an embodiment of the present invention.

It can be difficult to remember where cars are parked. Applications running on a mobile device can assist users in remembering the parking location and getting directions to the user's parked car by providing an interface for a user to manually mark the parking location. Embodiments of the present invention provide for the automatic determination that a car has been parked using a mobile device (e.g., a driver's smart phone). The mobile device can determine that the car is in a parked state by analyzing various parameters that can indicate whether the mobile device is inside of a moving vehicle, or inside or near a parked vehicle. For example, a wired or wireless connection between the mobile device and the vehicle can be a parameter. In some embodiments, parameters can include when the phone is unpaired (e.g., wireless connection, such as Bluetooth) or physically disconnected from the car (e.g., wired connection, such as 30-pin connector). There can be other parameters used alone or in combination with other parameters, which will be described further below.

Upon determining that the car is in a parked state, the location of the mobile device at the time of the parked state determination can be calculated (e.g., location coordinates). The location of the parking spot where the vehicle is parked can then be stored. For example, the location of the parking spot (e.g., <Latitude, Longitude>) can be associated with a parking location identifier variable (e.g., Current_Parking_Location=<Latitude, Longitude>, Parking_Location_On_Feb2=<Latitude, Longitude>, Last_Parking_Location=<Latitude, Longitude>, etc.). The stored location can be used at a later time when the user returns to the car and wants to know the parking location. In some embodiments, a maps application (or app) running on the mobile device can be used to visually present the location of the car.

In some embodiments, location data can be determined using a global position system (GPS) or another suitable location technology. However, in some situations, GPS location data (or other primary location technology) may not be available. For example, GPS signals may be unavailable inside a parking structure. Other weak or untrusted GPS scenarios are possible (e.g., urban canyon). A second location technology may be used to supplement the first location technology.

In some embodiments, mobile device sensor data may be used in combination with a known GPS location fix to determine the location of a parking spot. For example, one or more sensors on the device can measure bearing and distance traveled to (or from) a known location. The bearing and distance information can be used to approximate a location change from a known (trusted) GPS location fix. The known GPS location can be obtained before or after the GPS signal becomes unavailable.

For conciseness, vehicles such as cars are primarily described herein, but it is understood that embodiments of the invention could apply to any suitable vehicle. For example, a vehicle can be any suitable transportation machinery, such as an automobile, truck, a bus, a train, a tractor, a golf cart, a go-kart, a motorcycle, a scooter, bicycle, a motorized bicycle, a boat, a watercraft (e.g., a jet-ski), an aircraft, a lawn mower, a snowmobile, and/or the like. Further, it will be appreciated that the present invention is not limited to locating vehicles.

I. Overview and Method System

FIG. 1 is a high-level flow diagram of a method 100 according to an embodiment of the present invention. The method can be performed in any suitable order and one or more steps may be omitted or added without departing from the scope of the invention. Some steps may be performed in the background, while the mobile device is locked and without launching a maps app.

At block 110, a mobile device determines that a vehicle associated with a mobile device and/or mobile device user is in a vehicle transit state. This step can be optional. The mobile device can determine that the car is in a transit state by analyzing one or more parameters that indicate whether a mobile device is (or is not) in a moving vehicle. This is further described in Section II below.

At block 120, the mobile device can automatically determine whether the car is in a parked state by analyzing one or more parameters. Some parameters may indicate that the mobile device is in a vehicle (or just left a vehicle) that is in a parked state. This can be done in a similar fashion to determining whether the car is in a transit state (block 110) and is also described further in Section II below.

At block 130, the location of the parking spot of the vehicle is marked. If the vehicle is currently parked, the mobile device can request and receive location information from a location module. In some embodiments, the location can be the current location as determined by GPS at the time the parked state determination is made. In some embodiments, GPS location may not be available and the location may be determined using a combination of location technologies. This step is described further in Section III below.

At block 140, user interface features may be provided so that the user can utilize the marked parking location. For example, the parking location may be used in conjunction with a maps app so that the user can find his car. A user interface may also be used to annotate or modify information about the parking location (e.g., what level of the parking structure or correct an incorrect location marking). These use cases and others are described in Section IV below.

At block 150, the mobile device determines that a vehicle associated with a mobile device user is in a transit state similar to block 110. This step can be optional. After it is determined that the vehicle is again in a transit state, the parking location can be updated (block 160). In some embodiments, a parking location log maintains a record of past parking locations. This is also described with reference to the use cases in Section IV below.

Figure 2:
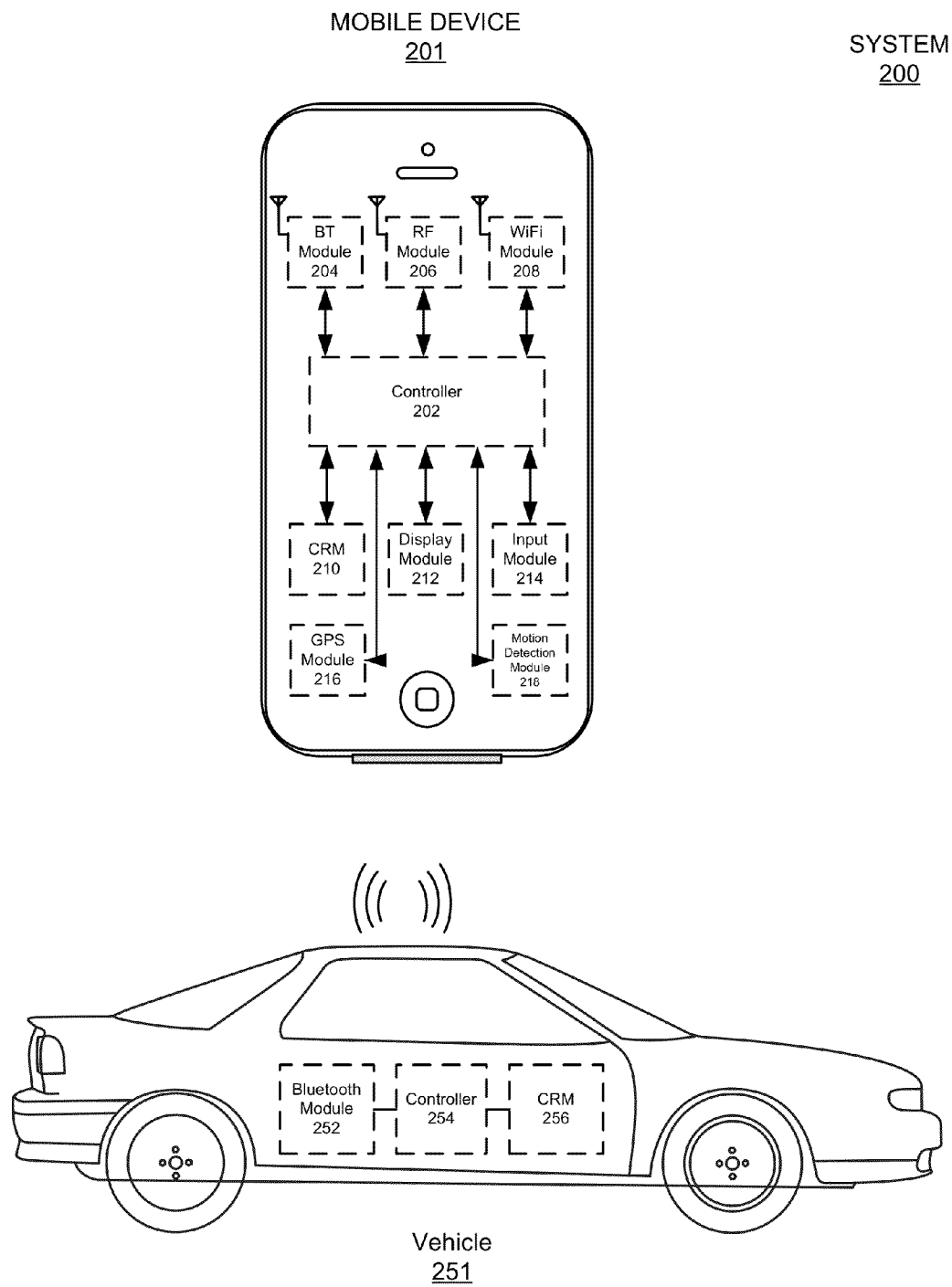
FIG. 2 illustrates a system including a mobile device and a vehicle according to another embodiment of the present invention.

FIG. 2 shows a high-level block diagram of a system 200. It will be further appreciated that the devices shown in FIG. 2 are illustrative and that variations and modifications are possible. System 200 can include a mobile device 201 and a vehicle 251.

Mobile device 201 can include a controller 202, a Bluetooth module 204, an RF module 206, a WiFi module 208, a computer-readable medium (CRM) 210, a display module 212, an input module 214, a global positioning system (GPS) module 216, and a motion detection modules 218. In some embodiments, mobile device 201 can include additional modules, such as battery modules, device orientation modules, magnetometer modules, three-dimensional gyroscope modules, connector modules, audio modules, three-dimensional video processing modules, acceleration detection modules, camera modules, and/or the like. In some embodiments, mobile device 201 can be a sufficient size, dimension, and weight to enable the device to be easily moved by a user. For example, mobile device 201 can be pocket size.

Controller 202, which can be implemented as one or more integrated circuits, can control and manage the overall operation of mobile device 201. For example, controller 202 can perform various tasks, such as retrieving various assets that can be stored in CRM 210, accessing the functionalities of various modules (e.g., interacting with other Bluetooth enabled devices via Bluetooth module 204), executing various software programs (e.g., operating systems and applications) residing on CRM 210, and so on. In some embodiments, controller 202 can include one or more processors (e.g., microprocessors or microcontrollers) configured to execute machine-readable instructions. For example, controller 202 can include a single chip applications processor. Controller 202 can further be connected to CRM 210 in any suitable manner.

Bluetooth module 204 can include any suitable combinations of hardware for performing wireless communications with other Bluetooth-enabled devices and allows an RF signal to be exchanged between controller 202 and other Bluetooth enabled devices. In some embodiments, Bluetooth module 204 can perform such wireless communications according to Bluetooth Basic Rate/Enhanced Data Rate (BR/EDR) and/or Bluetooth Low Energy (LE) standards. The Bluetooth protocol, in general, enables point to point wireless communications between multiple devices over short distances (e.g., 30 meters). Bluetooth has gained widespread popularity since its introduction and is currently used in a range of different devices. In order to allow Bluetooth to be used in a greater variety of applications, a low energy variant of the technology was introduced in the Bluetooth Core Specification, Version 4.0. Bluetooth Low Energy (LE), in general, enables devices to wirelessly communicate while drawing low amounts of power. Devices using Bluetooth LE can often operate for more than a year without requiring their batteries to be recharged.

For example, Bluetooth module 204 can include suitable hardware for performing device discovery, connection establishment, and communication based on only Bluetooth LE (e.g., single mode operation). As another example, Bluetooth module 204 can include suitable hardware for device discovery, connection establishment, and communication based on both Bluetooth BR/EDR and Bluetooth LE (e.g., dual mode operation). As still another example, Bluetooth module 204 can include suitable hardware for device discovery, connection establishment, and communication based only on Bluetooth BR/EDR.

RF module 206 can include any suitable combinations of hardware for performing wireless communications with wireless voice and/or data networks. For example, RF module 206 can include an RF transceiver that enables a user of mobile device 201 to place telephone calls over a wireless voice network.

WiFi module 208 can include any suitable combinations of hardware for performing WiFi based communications with other WiFi enabled devices.

CRM 210 can be implemented, e.g., using disk, flash memory, random access memory (RAM), hybrid types of memory, optical disc drives or any other storage medium that can store program code and/or data. CRM 210 can store software programs that are executable by controller 202, including operating systems, applications, and related program code.

Software programs (also referred to as software or apps herein) can include any program executable by controller 202. In some embodiments, certain software programs can be installed on mobile device 201 by its manufacturer, while other software programs can be installed by a user. Examples of software programs can include operating systems, vehicle locator applications, productivity applications, video game applications, personal information management applications, applications for playing media assets and/or navigating a media asset database, applications for controlling a telephone interface to place and/or receive calls, and so on. For example, software programs can include an application that enables a user of mobile device 201 to activate and control vehicle 106. Certain software programs can provide communication with and/or control of mobile devices, and certain software programs can be responsive to control signals or other input from mobile device 201.

Display module 212 can be implemented using any suitable display technology, including a CRT display, an LCD display (e.g., touch screen), a plasma display, a direct-projection or rear-projection DLP, a microdisplay, and/or the like. In various embodiments, display module 212 can be used to visually display user interfaces, images, and/or the like.

Input module 214 can be implemented as a touch screen (e.g., LCD based touch screen), a voice command system, a keyboard, a computer mouse, a trackball, a wireless remote, a button, and/or the like. Input module 214 can allow a user to provide inputs to invoke the functionality of controller 202. In some embodiments, input module 214 and display module 212 can be combined or integrated. For example, mobile device 201 can include an LCD-based touch screen that displays images and also captures user input. Illustratively, a user can tap his or her finger on a region of the touch screen's surface that displays an icon. The touch screen can capture the tap and, in response, start a software program associated with the icon. Upon starting the software program, a graphical user interface for the application can be displayed on the touch screen for presentation to the user.

As shown in FIG. 2, vehicle 251 can include Bluetooth module 252, controller 254, and CRM 256. Bluetooth module 252 can include any suitable combinations of hardware for performing wireless communications with other Bluetooth enabled devices and allows an RF signal to be exchanged between controller 254 and other Bluetooth enabled devices. In some embodiments, Bluetooth module 252 can perform such wireless communications according to Bluetooth Basic Rate/Enhanced Data Rate (BR/EDR) and/or Bluetooth Low Energy (LE) standards. For example, Bluetooth module 252 can include suitable hardware for performing device discovery, connection establishment, and communication based on only Bluetooth LE (e.g., single mode operation). As another example, Bluetooth module 252 can include suitable hardware for device discovery, connection establishment, and communication based on both Bluetooth BR/EDR and Bluetooth LE (e.g., dual mode operation). As still another example, Bluetooth module 252 can include suitable hardware for device discovery, connection establishment, and communication based only on Bluetooth BR/EDR.

In some embodiments, vehicle 251 may have other modules, such as a navigation module, RF modules, WiFi modules, display modules, input modules, global positioning system (GPS) modules, motion detection modules, device orientation modules, magnetometer modules, three-dimensional gyroscope modules, connector modules, audio modules, three-dimensional video processing modules, acceleration detection modules, camera modules, and/or the like.

Controller 254, which can be implemented as one or more integrated circuits, can control and manages certain operations of vehicle 251. For example, controller 254 can perform various tasks, such as accessing the functionalities of various modules (e.g., interacting with other Bluetooth enabled devices via Bluetooth module 252), executing various software programs residing on CRM 256, executing various vehicle-related operations and so on. In some embodiments, controller 254 can include one or more processors (e.g., microprocessors or microcontrollers) configured to execute machine-readable instructions. Controller 254 can further be connected to CRM 256 in any suitable manner.

CRM 256 can be implemented, e.g., using disk, flash memory, random access memory (RAM), hybrid types of memory, optical disc drives or any other storage medium that can store program code and/or data. CRM 256 can store program code that is executable by controller 254.

It will be appreciated that the mobile device 201 and vehicle 251 are illustrative and that variations and modifications are possible. Further, while portable device 201 and vehicle 251 illustrated have been described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatuses including electronic devices implemented using any combination of circuitry and software.

II. Parked State Determination

In some embodiments, a mobile device can continuously or periodically determine whether a car is in a transit state, a parked state, or an undetermined state. For example, as the user of vehicle 251 operates the vehicle (e.g., in order to locate a parking spot), mobile device 201 can continuously monitor the state of the vehicle to determine whether the vehicle has been parked. Mobile device 201 can determine the state of vehicle in any suitable manner and using any suitable information. For example, the mobile device can determine that the car is in a transit or parked state by analyzing various input parameters that are detectable by the mobile device and making inferences about the state of a vehicle associated with a user of the mobile device (e.g., a passenger or operator of the car). Input parameters can include any suitable parameter that might give an indication of the state of the mobile device and/or vehicle associated with a user of the mobile device, including network connectivity (or lack thereof), physical sensor data, and external data or input.

Figure 3:
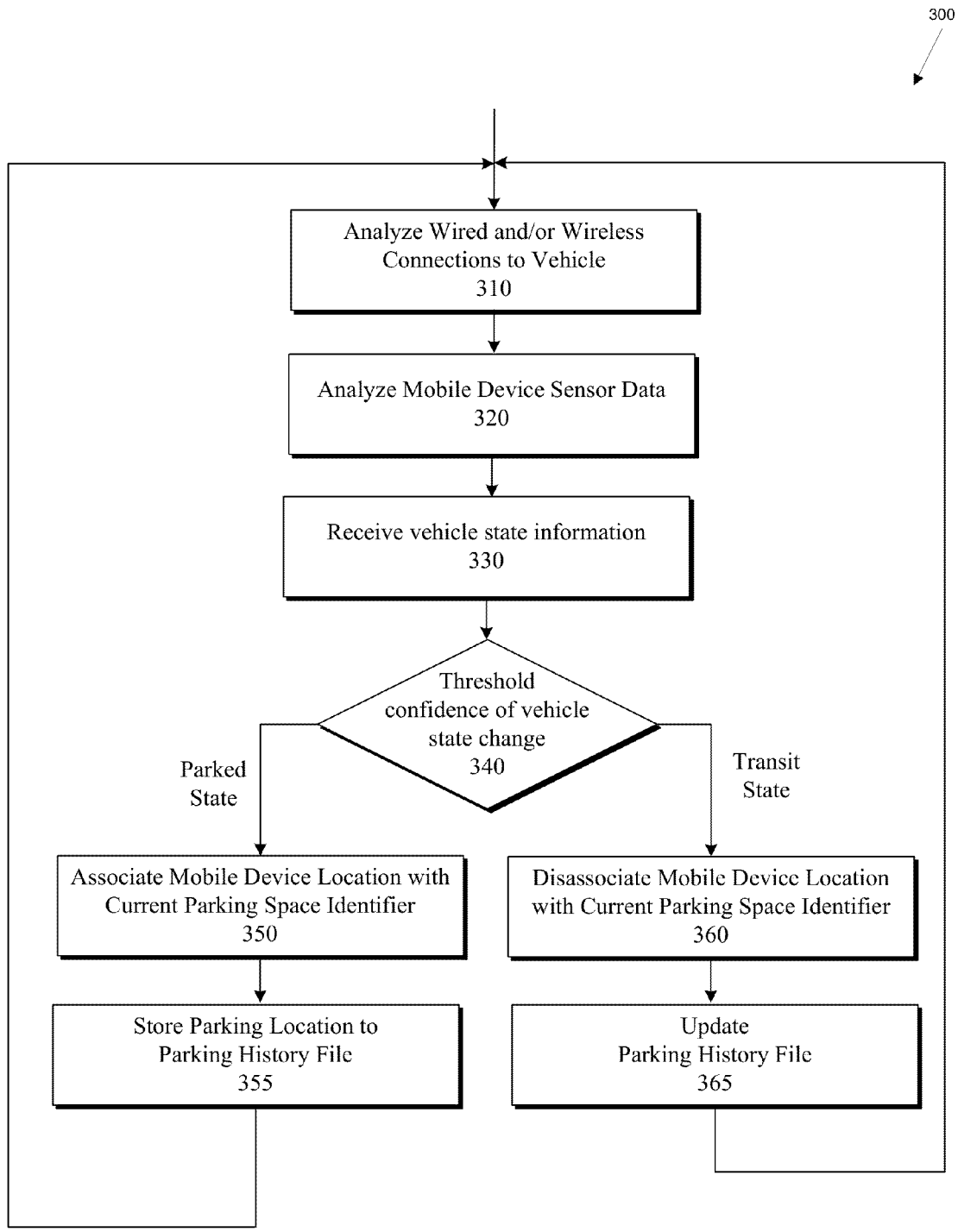
FIG. 3 is a flow diagram of a process usable by a mobile device to determine the state of a vehicle according to an embodiment of the present invention.

FIG. 3 illustrates a method 300 of determining whether a car is in a transit state or a parked state. At a high-level, the process can begin with analyzing various parameters that can indicate whether the car is parked or not (blocks 310, 320, 330). Based on the inputs analyzed in blocks 310, 320, and 330, the various parameters can be weighted to provide an overall confidence score for whether the car is parked. One or more of these steps are optional and may be performed in any order. For example, at block 310 the mobile device may analyze whether one or more wired or wireless connections exist between the mobile device and the vehicle. At block 320, the mobile device can analyze sensors on the mobile device to make an inference that the vehicle is in a parked or transit state. At block 330, if the mobile device and the vehicle are in communication with each other, the mobile device can receive vehicle state information or other information directly from the vehicle.

At block 340, in some embodiments, if the confidence score is greater than a predetermined threshold, then the car state is determined to be parked or in transit. If the confidence score is less than the predetermined threshold, then the car state may be undetermined or may be considered to remain at its last known state. Regardless of the determination, the mobile device can continue to monitor the state of the vehicle.

At block 350, if it is determined that the car is in a parked state, the method can include associating the mobile device location with a current parking space identifier. The identifier may be stored with the location in a list, database, or other suitable data structure (block 355).

At block 360, if it is determined that the car is in a transit state (following a parked state where location was marked), the mobile device may disassociate the mobile device location with the current parking space identifier. Then the list, database, or other suitable data structure can be updated (block 365).

The following subsections describe how a mobile device can automatically determine that a car associated with a mobile device is parked (e.g., the steps shown at blocks 310, 320, 330, and 340). In certain embodiments, the methods described can be combined or used separately. Subsection II.A describes certain embodiments where the connection/disconnection state between the mobile device and the vehicle can be used to determine whether the car is in a transit state, a parked state, or an undetermined state. Subsection II.B describes certain embodiments where mobile device sensor data parameters and/or other input can be used to determine whether the car is in a transit state, a parked state, or an undetermined state. Subsection II.C describes certain embodiments where signals received from the car system can be used to determine whether the car is in a transit state, a parked state, or an undetermined state. Section II.D describes certain embodiments where combined inferences are made using a confidence score.

A. Connection and/or Disconnection Between Mobile Device and Vehicle

As described, various entities (e.g., mobile devices, vehicles) described herein can communicate over one or more wireless connections. According to some embodiments, mobile device 201 can determine the state of a vehicle based on the mobile device's connection with vehicle 251. Illustratively, mobile device 201 and vehicle 251 can establish a connection with one another (e.g., a Bluetooth or Bluetooth LE connection). During operation, mobile device 201 can periodically or continuously monitor its connection with the vehicle. If the connection is terminated or the vehicle is no longer responsive over the connection, mobile device 201 can determine that the vehicle has been turned off (e.g., both the vehicle's engine and electrical system have been shut down). Based on this information, mobile device 201 can determine that the vehicle is currently in a parked state. Conversely, mobile device 201 can determine that the vehicle is currently in a transit state based on a connection with the vehicle 251.

Currently, many wireless communication standards exist for enabling different devices to communicate. The following description primarily refers to communication using Bluetooth and/or Bluetooth LE connections. However, one skilled in the art will appreciate that the techniques disclosed in this specification are equally applicable to other types of connections, such as wired and other types of wireless connections (e.g., near field communications, WiFi, infrared communication, or the like).

In general, Bluetooth allows voice and data communication between various devices without a physical cable, and instead uses frequency-hopping spread spectrum technology. Currently, Bluetooth exists in two variations: standard Bluetooth (e.g., Bluetooth Basic Rate/Enhanced Data Rate) and Bluetooth Low Energy (LE). As a general matter, Bluetooth LE operates similarly to standard Bluetooth, except that those interfaces using Bluetooth LE consume less power and operate with lower latency. Bluetooth LE, in addition, uses a different a set of channels from standard Bluetooth. In particular, Bluetooth LE operates over 40 two-MHz-wide channels rather than the 79 one-Mhz-wide channels used in standard Bluetooth. While Bluetooth and Bluetooth LE are not designed to be compatible with one another, many Bluetooth interfaces support both variations (e.g., the modules can operate in dual mode).

At the most basic level, devices supporting Bluetooth and/or Bluetooth LE can establish wireless connections with neighboring Bluetooth and/or Bluetooth LE devices using point-to-point connections. In particular, a master-slave structure can be established where one master device communicates with at least one slave device in a network group called a piconet.

Typically, in order for two Bluetooth devices to establish a connection, the devices must be paired through a connection procedure. The connection procedure is frequently triggered automatically the first time a device receives a connection request from a device with which it is not yet paired. During the pairing process, the mobile device and the car system can exchange pairing information, including device identifiers. Device identifiers can be used to differentiate between devices when connecting to different or multiple devices. Device identifiers can also be used to identify the manufacturer, product ID, product version, and the like. Initial pairing may require user intervention, e.g., to confirm that pairing is desired or to enter an authentication code. After a pairing has been established, parameters associated with the pairing can be remembered (e.g., stored) by the devices and a secure connection can be established. Following pairing, the paired devices can reconnect to each other without user intervention. If desired, the pairing relationship can later be removed by a user.

In some embodiments, mobile device and car systems automatically connect when they are powered on and within an operating range (e.g., a connected state or transitioning from a disconnected state to a connected state). For example, currently and depending on implementation, various Bluetooth devices can have maximum operating ranges of 1 meter, 10 meters, 100 meters, etc., although the real-world operating range may be more or less.

In some embodiments, the connection between the mobile device and the car system is broken (i.e., disconnected state or transitioning from a connected state to a disconnected state). In some embodiments, mobile device and car systems automatically disconnect when at least one of the two are powered off. In some embodiments, mobile device and car systems automatically disconnect when the distance separating the two devices is greater than an operational range. In some embodiments, the termination of the connection can be abrupt or without warning.

In some embodiments, the connection state between the mobile device and the car may be a connected state, a connected-to-disconnected transition state, a disconnected state, or a disconnected-to-connected transition state. The connection state between mobile device and the car can indicate (alone or in combination with other factors) the car is in a transit state, a parked state, or an undetermined state.

When a mobile device and car system are connected, this can be an indication that the user is in or near the car. It can also be an indication that the car is in a transit state. A recent connection event (e.g., a transition from disconnected to connected) between the mobile device and the car system can also be an indication of a transit state, or soon-to-be transit state. For example, when the mobile device transitions from a disconnected state to a connected state with the car system, the user may be entering the car, turning it on, and getting ready to drive.

When a mobile device and car system are disconnected, this can be an indication that the car (in which the user is a passenger or driver) has parked. A disconnection event (e.g., a transition from connected to disconnected) can also be an indication that the mobile device and user are no longer near the car; for example, the mobile device is outside the operating range of the wireless technology.

In some embodiments, a mobile device can detect a connection state change.

Based on the connection state change, the mobile device can determine whether the mobile device is in a car and/or whether the car is in a transit state. Based on the connection state change, the mobile device can determine whether the mobile device is away from a car and/or whether the car is in a parked state. When it is determined that a car is in a transit or parked state, the mobile device can take various actions, as described herein, including marking a parking location or updating a parking location.

In some embodiments, the car system can be a car stereo system, navigation system, or other system on the car. In some embodiments, the car system can be a peripheral that is coupled to the car (e.g., a dongle, key fob, or other electronic device that is affixed or connected to the car). For example, older cars may enable the described functionality by plugging in a small device to car power or by placing a battery powered device in or on the car (e.g., a Bluetooth Low Energy dongle).

In some embodiments, a connection (e.g., WiFi) can be established between the mobile device and the car system through a login process. For example, when connecting to a car WiFi network, a network identifier (SSID) may be required and a password/passcode (e.g., WEP password) may be required. Although Bluetooth and WiFi are described here, any suitable short- or medium-range wireless connection can be used. For example, the connection may use a car-specific communication protocol.

In some embodiments, a wired connection can be established between the mobile device and the car system (e.g., when the mobile device is docked). For example, the mobile device can detect that it is connected to power and that it is connected to a car system or a particular car system. Likewise, the mobile device can detect that is no longer connected to power or when the wired connection disconnects from a car system or a particular car system. A wired connection can be any suitable physical connection between the mobile device and the car system, such as a 30-pin connector, Lightning cable, USB cable, Ethernet cable, docking station, and the like. The mobile device and the car can be considered connected when the mobile device is docked, mounted, or otherwise physically connected to the car.

The connection and/or disconnection between a mobile device and vehicle can be used in combination with other input or data to make inferences about the state of a car associated with a user of the mobile device. Some of these embodiments are described in the following subsections and it is appreciated that they could be combined with the connection/disconnection state interferences described above.

B. Inferential Determination Parking Determination

In some embodiments, contextual information can be used to make inferences and determine whether the car is in a transit state, a parked state, or an undetermined state. Contextual information can include any suitable physical sensor parameter that might give an indication of the state of the mobile device and/or vehicle associated with a user of the mobile device. Contextual information may also include navigation input, maps and business data, user-triggered input, transactional data, external data or input, and the like. This contextual information can be analyzed and used to determine the state of the mobile device and/or car. For example, the mobile device can evaluate sensor data parameters or other input to make an inference about the state of the mobile device and/or car.

Physical Sensor Data

Mobile device sensors that capture physical sensor data can include GPS units, motion sensors, elevation sensors, audio sensors, image sensors, transactional input, and external parking location transponders/identifiers, and the like. Input to a device sensor can include any input that is measurable by a device sensor. In some embodiments, mobile device 201 can determine the state of vehicle 251 based on information collected and/or received from various modules embedded in the mobile device.

In some embodiments, GPS units can be used for location- and/or speed-based inferences. Modern GPS units can provide increasingly precise geographic coordinates and, in some cases, current speed information. The GPS location of a mobile device can be used to determine that a car associated with a mobile device user is parked (or in transit). For example, mobile device 201 can determine that the vehicle is currently stationary based on information collected by a GPS module embedded in the mobile device. In particular, mobile device 201 might determine, based on the coordinates provided by a GPS module, that the mobile device has not changed location for a specific period of time (e.g., 30 seconds, 1 minute, etc.). Based on such a determination, mobile device 201 can determine that vehicle 251 is currently in a parked state.

In some embodiments, a GPS location can indicate the position of the mobile device (car) relative to a road or sidewalk. For example, if the GPS location indicates that the mobile device is on the side of the road, on a sidewalk, or adjacent to the road, the mobile device can infer that the car is parked. For example, the car could be parked in a street parking spot, or the user could be walking on the sidewalk after parking, or the car could be parked at a parking lot just off the road.

Certain sensors can provide current speed information (e.g., GPS, accelerometers, etc.). The current speed of the mobile device and/or changes in relative speed of the mobile device can be indicative of the car being in a parked state or a transit state. For example, if the current speed of a mobile device is greater than 35 miles per hour, then the mobile device is likely in a car or other motorized vehicle. In another example, if the speed measured by the mobile device was greater than 35 miles per hour followed by a much slower pace consistent with a human walking (e.g., 1-3 MPH), then it can be inferred that a car was parked and the user is walking away from the car.

In some embodiments, motion sensors such as accelerometers can indicate whether a car associated with a mobile device user is in a parked state or a transit state. Certain motion patterns, for example, may be associated with specific transit activities. For example, walking with a mobile device may generate an up-down motion with the user's gait. Riding a bicycle may generate a more circular motion when pedaling. Riding or driving in a car may generate more uniform acceleration and deceleration patterns, for example, laterally, as opposed to up and down or circular. In any event, motion data from motion sensors may be analyzed for patterns consistent with being in transit (e.g., driving a car or riding a bike) or having recently parked a vehicle (e.g., walking from the vehicle). In some embodiments, motion patterns can be used as a parameter to determine whether the vehicle is in a parked state As another example, mobile device 201 can determine that a door of vehicle 251 is currently opened based on information collected from a sensor module, a camera module, a microphone, etc. In some embodiments, a camera can be used to make inferences about whether the car is parked or not. For example, image recognition can be used to analyze an image (still or video) and determine whether the visible area is consistent with a parking spot.

In other instances, mobile device 201 can use an embedded microphone to determine whether the vehicle is parked or in transit. For example, a particular warning sound may be broadcasted by vehicle 251 when the door of the vehicle is open. Based on such a determination, mobile device 201 can determine that the vehicle is currently in a parked state. In some embodiments, the car's engine noise or vibration can be measured by sensors on the mobile device. This can indicate that the car is on or off, and based on this the mobile device can infer whether the car is in a parked or transit state.

In some embodiments, an elevation sensor can be used to measure elevation of the mobile device. If the elevation of the mobile device is higher or lower than a known elevation for a particular street location, the mobile device can infer that the car has entered a multilevel parking structure.

One having skill in the art will recognize that other sensors could be used to make inferences about whether a car is parked or in transit.

Other Input

Other input that can be used to infer the state of a car associated with a user of a mobile device includes information from a navigation unit (on the mobile device or part of car system), map and business data, transactional data, and the like. In some embodiments, the other types of input can be used in combination with other information, such as location data.

In some embodiments, maps and business data (locally stored on the device or in the cloud) can be used to make inferences about whether a car is in a parked or transit state. For example, business data may indicate whether a given location is a common place to park or if the location is a designated parking area (e.g., parking lot or structure). Business data may also indicate whether a given location is more likely to be "passed through," rather than stopped at (e.g., drive through windows near a freeway). Business data may indicate whether the popularity of a given location by time, day of week/month, or season. The likelihood of a user parking at a given location may be calculated using map and business data.

In some embodiments, a GPS location can indicate that the mobile device is at a known parking area (e.g., parking garage or lot). When the GPS location is within a threshold distance of a known parking location, the mobile device can infer that the car is parking or about to park. In some embodiments, a GPS location can indicate that the mobile device is near an area with a high parking density (e.g., based on maps and business data) and therefore it is an area that the car is more likely to be parked. In some embodiments, a GPS location can indicate that the mobile device is not near any known parking areas and infer that the car is not parked or parking.

In some embodiments, a navigation or maps app can be used to determine the state of the vehicle. For example, a navigation app running on the mobile device can be used to get directions to a user-specified destination, for example, turn-by-turn driving directions. When the user reaches the destination, the navigation sequence may end (e.g., the app may indicate that the user has arrived at the destination, cease providing directions, and/or exit the application). Scenarios where the user has arrived at the destination (or is near the destination) can be referred to as end of navigation scenarios. Inferences can be made based on end of navigation scenarios using data from the navigation or maps app. For example, when the location is near the user-specified destination, the mobile device can infer that the mobile device user will be parking soon.

In addition to route guidance information, some embodiments can also provide payment or transactional information. For example, when a user parks, the payment information may indicate the rate charged by an operator of the parking structure for that particular stall or an approximate total charge based on information provided by the user indicating how long she intends to park. When a user returns to a vehicle, the payment information can indicate the amount due and can also indicate how and/or where payment can be made, e.g., by providing guidance information indicating the location of a payment kiosk. In some embodiments, a user with a suitably equipped mobile device may be able to communicate with the parking system to pay for parking directly from her mobile device.

In some embodiments, transactional input (e.g., purchases or reservations made with the mobile device) may be used to infer the state of a car. For example, parking may be paid for using the mobile device or proof of payment may be provided using the mobile device upon arrival at a parking area. Knowing that the mobile device has arrived at a parking area based on transactional input, the mobile device can make an inference regarding parking status.

C. Mobile Device Receives Signal from Car

In certain embodiments, mobile device 201 can determine the state of vehicle 251 based on state information received directly from the vehicle. Modern cars often have advanced computer systems that monitor and record various aspects of the operation of the car. In some embodiments, a signal received from the car system can be used to determine whether the car is in a transit state, a parked state, or an undetermined state. For example, car computer systems may detect when a door is open and display a message or "door open" warning on the dashboard.

In another example, car computer systems may detect whether the transmission is in Park, Drive, Reverse, and/or whether the brake pedal, gas pedal, or parking brake is being applied. There are many other examples of car sensors that are connected to the car computer system, including key in on/off position, key in/out of ignition, whether seats are occupied, keyless entry sensor, the operational state of certain vehicle components, the length of time the vehicle has been in a certain operational state, length of time the vehicle has been stationary, and the like.

Car status information may be communicated to the mobile device using a wired or wireless connection. Upon receipt of car status information from the car computer system, the mobile device can determine whether the car is in a transit state, a parked state, or an undetermined state. In some embodiments, the signal with car status information can explicitly inform the mobile device that the car is parked. In some embodiments, the signal with car status information can be used to make an inference that the car is parked according to the disclosure herein.

Illustratively, mobile device 201 and the vehicle can establish a connection with one another (e.g., a Bluetooth or Bluetooth LE connection). After establishing the connection, mobile device 201 can periodically or continuously receive state information from the vehicle. Mobile device 201 can receive, from the vehicle, the current state of the vehicle's engine, the position of the transmission of the vehicle, etc. During operation, mobile device 201 can receive information indicating that the vehicle's engine is currently turned off and/or the vehicle's transmission is in park. Based on this information, mobile device 201 can determine that the vehicle is currently in a parked state. In other embodiments, vehicle 251 can directly indicate to mobile device 201 that the vehicle is currently parked.

D. Combined Inferences and Confidence Score

In some embodiments, combinations of inferences may be used, and mobile device 201 can determine that vehicle 251 is currently in a parked state based on any suitable combination of collected and/or received information. The information/data received and analyzed at blocks 310, 320, and 330 may be weighted and a confidence score may be calculated at block 340. When the threshold confidence levels are met, the mobile device can determine the state of the car. By determining the state of vehicle 251 through using multiple indicators, mobile device 201 can more reliably determine the state of the vehicle.

For example, mobile device 201 can determine that vehicle 251 is currently parked if mobile device 201 has been substantially stationary for a certain period of time and vehicle 251 is currently broadcasting a warning sound indicating that its door is currently open. Either one of these factors alone may not, in some embodiments, be sufficient for the mobile device to confidently determine that the car is parked. However, in combination, the mobile device may determine with threshold confidence that the mobile device is in a car that recently parked.

In another example, the mobile device may detect that it is located near or at a known parking area (e.g., garage) with GPS. Then, the mobile device may subsequently detect walking characteristics with a motion sensor (e.g., walking speed, walking motion versus car speed/motion). Based on these two parameters, the mobile device can determine with threshold confidence that the car parked and the user left the car with the mobile device. If, for example, the mobile device only determined that it was located near a parking garage, it is possible that the confidence threshold would not be met and the car state could be labeled as an undetermined state or transit state.

In some embodiments, multiple tiers of inferences can be used. For example, one parameter may indicate that the car is likely parked but more information may be analyzed to confirm this weaker inference. In some embodiments, more resource intensive methods may be used after an initial (weaker) inference. In this manner, resources (e.g., power, data, etc.) can be conserved.

In some embodiments, inferences can be combined with user input to determine the location of a parked car. For example, a user can park a car and walk away. When the user is at some distance from the car, the user may provide an input indicating the user recently parked the car (e.g., voice command, touch interface input, or other input). Based on the user input, the mobile device may analyze inferential data to determine where the car is parked. For example, the mobile device may analyze connection information, location information, and/or sensor data from a predetermined period before and leading up to the user input parking indication. The predetermined period may be specified based on user input (e.g., if the user indicated that the car was parked 5, 10, etc. minutes ago) or may be based on a default value.

III. Determining Parking Location in Weak Location Signal Scenarios

When the mobile device determines that a car associated with the user of the mobile device has parked, it can be beneficial to mark the location of the parking spot. The location can be determined using conventional location technologies, such as GPS, WiFi/cellular triangulation, crowdsourced WiFi, time of flight calculations (ToF) using any suitable technology, and the like. However, in some circumstances, these location technologies may not be available or accurate. In some embodiments, the last known location before the location technology becomes unavailable is used. In some embodiments, the next known trusted location after the location technology become available again in used. In some embodiments, mobile phone sensor data can be used to determine the location of the mobile device and hence the car.

Figure 4A:
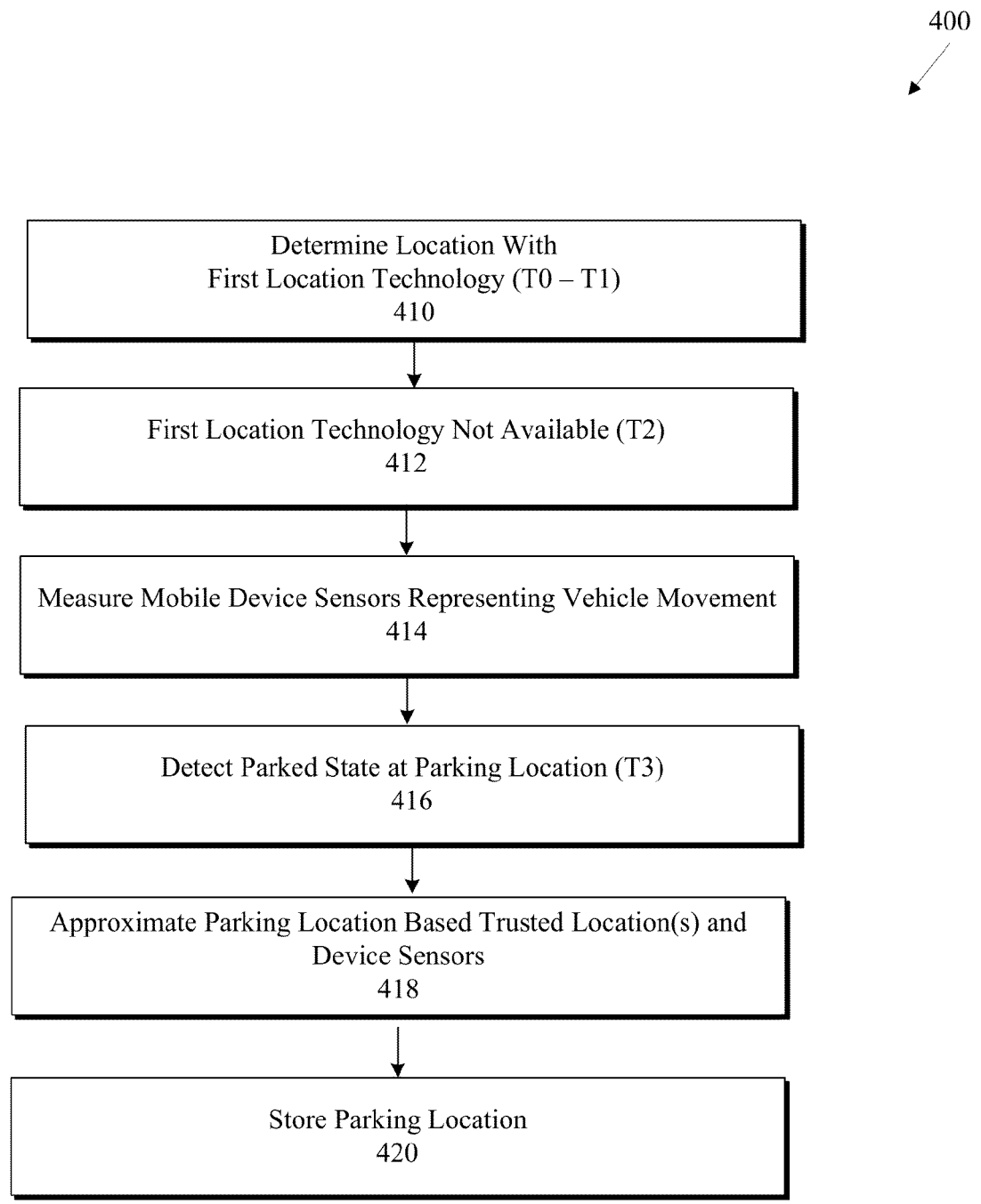
FIGS. 4A and 4B are flow diagrams of processes usable by a mobile device to determine a location of a parked vehicle when a weak location signal condition exists according to an embodiment of the present invention.

FIG. 4A illustrates a method 400 of determining location when a first location technology, such as GPS, is not available. The process can be performed in any suitable order and one or more of the steps may be omitted without departing from the scope of the present invention.

The process can begin with periodically determining the location of a mobile device with a first location technology (block 410). One example of periodically determining location could be the frequency that a maps app determines location when providing driving directions or turn-by-turn directions. This is merely an example and one having skill in the art will recognize that different periods can be used (e.g., once a second, once a minute, as triggered by events, etc.). The result of periodically determining location can be geographic location data, such as latitude and longitude coordinates or the like. As shown in block 410, the mobile device can periodically determine its location using the first location technology during a time period T0 through T1. A set of geographic location data may be generated for each periodic determination of location (e.g., Location at T0, Location at T1, and any location determined in between T0 and T1).

At block 412, the first location technology may become unavailable. The first location technology may become unavailable for any number of reasons, including weak or no signal and untrusted data. For example, the mobile device may enter a parking structure or an "urban canyon" that obstructs GPS signals. As illustrated at block 412, the first location technology can become unavailable at a time designated T2. Therefore, in the embodiment illustrated, the last known location is the location at time T1 and the location at time T2 cannot be determined using the first location technology.

At block 414, the mobile device can measure sensors (e.g., accelerometer, compass, gyroscope, etc.). In some embodiments, sensor data may be collected continuously or on a periodic basis. In some embodiments, the sensor data may be collected at time T1 and may be continuously or periodically collected thereafter. In some embodiments, the sensor data may be collected at time T2 and may be continuously or periodically collected thereafter. One having skill in the art will recognize that sensor data may be collected and measured at other times as well. In some embodiments, an accelerometer is used to determine speed and/or distance traveled. In some embodiments, a compass is used to determine direction of travel. In some embodiments (not shown), speed and direction information may be received from the car system instead of (or in addition to) sensor data from the mobile device. For example, the car may have a speedometer and/or odometer and distance, time, and/or speed measurements may be transmitted from the car system to the mobile device through a connection as described herein.

At block 416, the mobile device can detect a parked state. For example, the mobile device may detect a parked state as described in Section II. As illustrated, the determination that the car associated with the mobile device user is in a parked state can occur at a time designated T3. In the embodiment illustrated, time T3 occurs subsequent to time T2. That is, some amount of time has passed since the first location technology became unavailable before the mobile device identifies a parked state. The mobile device can therefore measure and record mobile device sensor data in the time period from time T2 to time T3.

Responsive to detecting the parked state, at block 418, the location of the mobile device at a time when the mobile device identified a parked state (e.g., at time T3) can be calculated. In some embodiments, the location at time T3 can be calculated based on the location at T1 (as determined by first location technology, such as GPS) and the sensor data collected at block 414. In some embodiments, location data (e.g., coordinates) at T1 may be adjusted based on sensor data. For example, if sensor data indicates that the mobile device moved 100 meters west and 50 meters south between T1 and T3, the location determined at T1 may be modified as such. That is, the sensor data can be used to "look forward" from the known location at time T1.

At block 420, the parking location can be stored. As described above, the parking location is the location at time T3 when the mobile device detects a parked state of a car associated with a mobile device user. In some embodiments, the parking location may be calculated based on known location at time T1 as supplemented by sensor data from a period between T1 and T3.

Figure 4B:
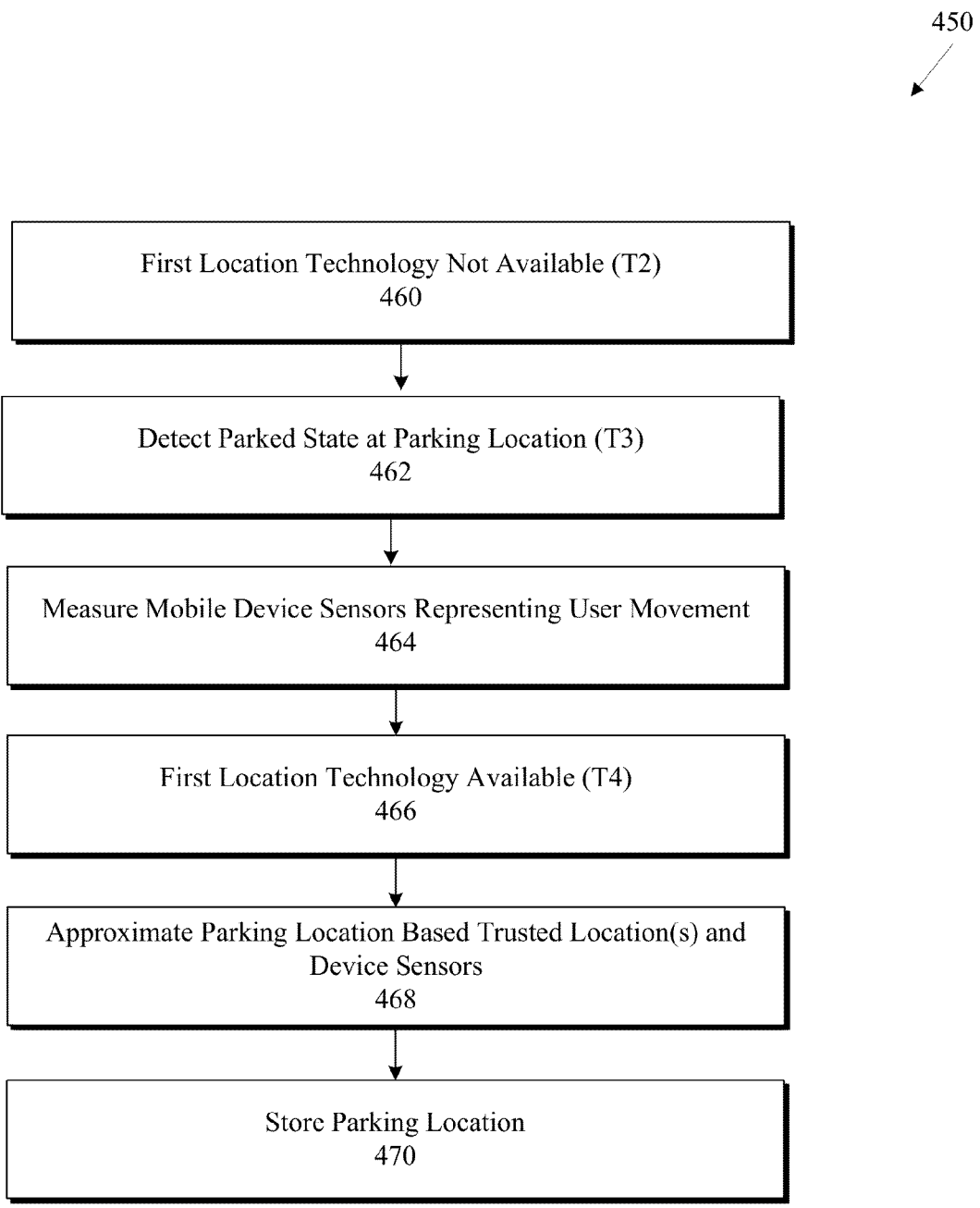

FIG. 4B illustrates a method 450 of determining location when a first location technology, such as GPS, is not available. The process can be performed in any suitable order and one or more of the steps may be omitted without departing from the scope of the present invention. In some embodiments, a parking location can be determined using method 450 in combination with method 400, described above.

At block 460, the first location technology may become unavailable. The first location technology may become unavailable for any number of reasons, including weak or no signal and untrusted data. For example, the mobile device may enter a parking structure or an "urban canyon" that obstructs GPS signals. As illustrated at block 460, the first location technology can become unavailable at a time designated T2. Therefore, the location at time T2 cannot be determined using only the first location technology.

At block 462, the mobile device can detect a parked sate. For example, the mobile device may detect a parked state as described in Section II. As illustrated, the determination that the car associated with the mobile device user is in a parked state can occur at a time designated T3.

At block 464, the mobile device can measure mobile device sensors. In some embodiments, the mobile device sensors detect foot traffic movement data, such as the distance and direction of a mobile device user's path from a car parking space to a second location. The foot traffic movement data can be measured and recorded periodically so that a distance and direction can be approximated.

At block 466, the first location technology may become available again. For example, GPS may become available such that a trusted GPS location fix can be obtained. As illustrated, the first location technology may become available at a time designated T4. In the embodiment illustrated, time T4 occurs subsequent to time T3. Sensor data may be collected periodically or continuously during the time period from time T3 to time T4.

At block 468, the parking location (e.g., location of mobile at T3) may be estimated using a trusted location and sensor data. In some embodiments, sensor data may be measured from the time T3 (parked state) to time T4 (first location technology available). Therefore, the location at T4 is known, and the location at time T3 can be calculated using Location at time T4 as supplemented with sensor data. For example, if sensor data indicates that the mobile device moved 100 meters west and 50 meters south between T3 and T4, the location determined using first location technology at T4 may be modified as such. That is, the sensor data can be used to "look backwards" from the known location at time T4.

In some embodiments, the methods 400 and 450 may be combined to estimate the location of a parking spot. For example, an estimated location may be calculated based on a first sensor-assisted location combined with a second sensor-assisted location. The first sensor-assisted location can be calculated based on a first known location (e.g., at time T1 in block 410 of FIG. 4A) supplemented by first sensor data (e.g., sensor data collected between T2 and T3 in block 414 in FIG. 4A). The second sensor-assisted location can be calculated based on a second known location (e.g., at time T4 at block 466 of FIG. 4B) supplemented by second sensor data (e.g., sensor data collected between T3 and T4 in block 464 in FIG. 4B). In some embodiments, the estimated location can be an average of the first sensor-assisted location and the second sensor-assisted location. In some embodiments, the estimated location based on one of the first sensor-assisted location or the second sensor-assisted location is based on a confidence score. For example, one of the first sensor-assisted location or the second sensor-assisted location may be determined to be more accurate or trustworthy than the other.

At block 470, the parking location can be stored. As described above, the parking location is the location at time T3 when the mobile device detects a parked state of a car associated with a mobile device user. In some embodiments, the parking location may be calculated based on known location at time T4 as supplemented by sensor data from a period between T3 and T4.

As described herein, embodiments can provide for reliable, power efficient, and cost effective locating of vehicles. More specifically, many parking structures are typically enclosed and/or built underground and/or on multiple levels. Due to such configurations, conventional location systems based solely on GPS are often ineffective. For example, GPS signals often are unable to reach devices that are underground or to distinguish between levels within a structure. Even outdoor parking areas can be affected by "urban canyons" and other weak or untrusted GPS situations.

Figure 5:
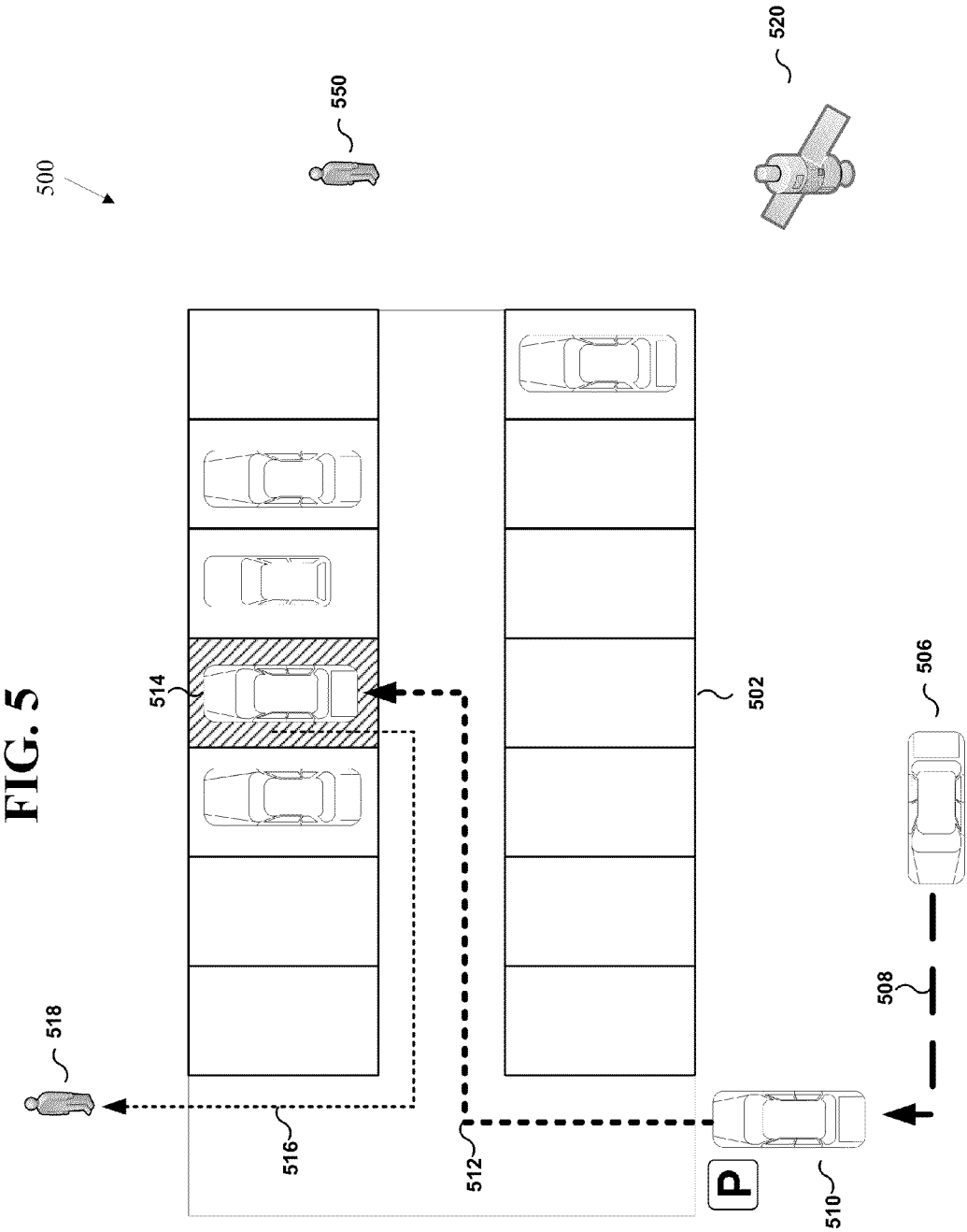
FIG. 5 illustrates an example parking system with a parked vehicle according to an embodiment of the present invention.

FIG. 5 illustrates a system 500 including a parking area 502, such as a parking structure or parking lot, and a vehicle (e.g., car 251) at various positions at various times. A mobile device (not shown) and a mobile device user can be in the car 251 and/or operating the car. The system can include one or more parking spots occupied by one or more other vehicles.

In one example, a mobile device is inside of a car and the location of the mobile device is determined periodically. The location can be determined using GPS (e.g., using signals from satellites 520). The location of the car at an initial time (e.g., T0 in FIG. 4) may be determined. In FIG. 5, the location at an initial time is shown by car position 506. The location information for car position 506 may be any suitable location data, including geographic coordinates.

After an initial time when the location of the car is known, the car can travel along a driving path 508. In some embodiments, the distance and direction of the driving path may be measured using GPS. In some embodiments, the distance and direction of the driving path may be measured using one or more motion sensors of the mobile device and/or sensors that are part of the car system.

The location of the car at a second time (e.g., T1 in FIG. 4) may be determined. In FIG. 5, the location at the second time is shown by car position 510. The location can be determined using GPS (e.g., using signals from satellites 520). In some embodiments, the location may be determined multiple times between car position 506 and car position 510 using GPS.

Subsequently, the GPS location technology may become unavailable, e.g., the signal may be blocked or otherwise become unreliable (T2 in step 412 in FIG. 4). For example, the car may have entered a parking structure 502 or otherwise have weak or untrusted GPS location data. At this point in time, the mobile device may know its last trusted location (e.g., car location 510 at time T1 as determined by GPS), but it may not be able to determine the precise location of the parking spot inside the parking area. The car can travel along a driving path 512. The distance and direction of the driving path may be measured using one or more motion sensors of the mobile device. This can be referred to as car (pre-parked state) movement data, which can include any suitable sensor measurement (e.g., distance, speed, direction, bearing, elevation, and the like).

After traveling along driving path 512, the car may park at parking position 514. The mobile device can detect the parked state, as described herein. Referring back to FIG. 4A, for example, the mobile device can determine that the car was parked at block 416. The car movement data can represent the driving path 512 and can be combined with a last known trusted location (e.g., car location 510) to calculate a parking location in a weak GPS scenario. The manner of calculating the parking position 514 based on a last known car position 510 (determined using GPS) and car movement data representative of the driving path 512 is an example of the method shown in FIG. 4A above.

In some embodiments, the mobile device user can leave the car with the mobile device and walk along a walking path 516. In some embodiments, the distance and direction of the walking path 516 may be measured using one or more motion sensors of the mobile device. This can be referred to as user (post-parked state) movement data, which can include any suitable sensor measurement (e.g., distance, speed, direction, bearing, elevation, and the like). Subsequently, when the user exits the parking structure, GPS location may become available and provide an updated GPS location at user position 518. The updated location may be combined with the user movement data collected from the time that the parking state was detected to estimate the location of the parking space. The manner of calculating the parking position 514 based on a user position 518 (determined using GPS) and user movement data (from mobile device sensors) representative of the walking path 516 is an example of the method shown in FIG. 4B above.

Figure 6:
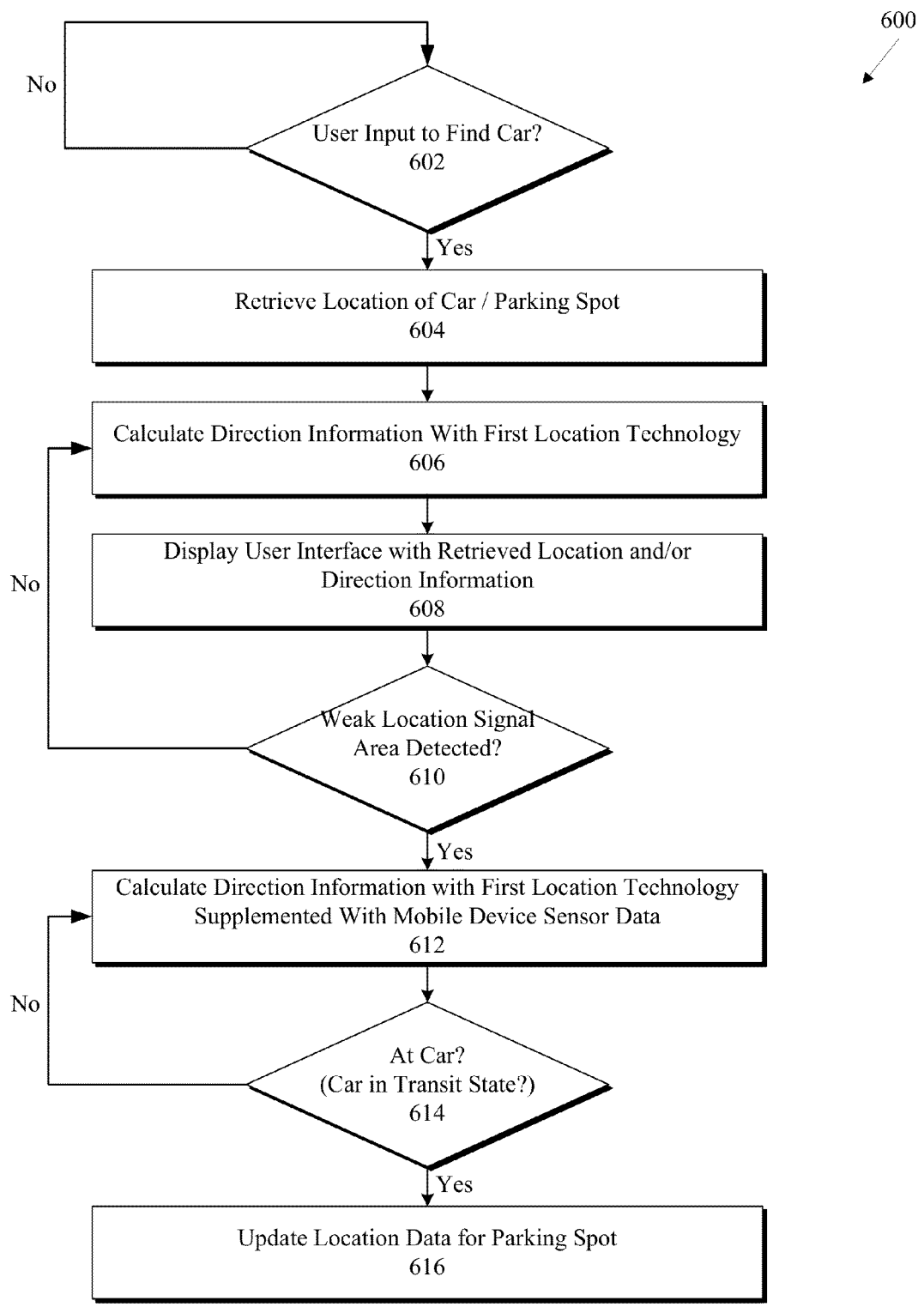
FIG. 6 is a flow diagram of a process usable by a mobile device to locate a vehicle according to an embodiment of the present invention.

FIG. 6 illustrates a method 600 of determining location when a first location technology, such as GPS, is not available when a user is returning to a vehicle location with a weak location signal. For example, method 600 may be performed when a user wishes to return to her vehicle. The process can be performed in any suitable order and one or more of the steps may be omitted without departing from the scope of the present invention.

At block 602, mobile device 201 can receive a user input to find the car. At this point in the time, the car location may have been marked using any suitable method, including GPS or a process similar to that described with reference to FIGS. 4A and 4B. The user input can be any suitable user input, including a touch-based user input, voice command, input from an I/O device, etc. For example, the user can touch a soft key on the screen or speak a "find my car" voice command. Without user input to find the car, the process can repeat (i.e., continuously or periodically determine if a user input has been received).

At block 604, mobile device 201 retrieves the location of the car's parking location. The parking location data may include any suitable data such as location coordinates and/or distance and bearing information. The parking location may be determined as described with reference to FIGS. 4A and 4B.

At block 606, mobile device 201 can calculate direction information with a first location technology (e.g., GPS). The direction information can be based on the current location of mobile device 201 (e.g., the location at the time that the user input to find car is received). Direction information can be any suitable information that describes how to proceed from the current location to the stored parking location.

At block 608, mobile device 201 may display a user interface to assist the user in finding the car's location. The user interface may display the retrieved parking location and/or direction information in a text and/or graphical format. In some embodiments, the retrieved parking location and/or direction information may be displayed in a map. In some embodiments, direction information may be displayed with visual or audio cues (e.g., directional arrows with distance information; different rates of beeping; etc.). Using the direction information, the user can begin the course back to the car location.

At block 610, a weak location signal for the first location technology (e.g., GPS) may be detected. The weak signal may be detected in a number of ways including when there is a loss of one or more satellite signals, when a signal strength indicator falls below a predetermined threshold, or when a device enters a known dead or weak zone. In some embodiments, mobile device 201 may determine that it is entering (or is near) a weak location signal area, for example, because the mobile device previously detected a weak signal at or near the location (e.g., mobile device can remember that, when it detected a parked state, the location signal was weak or unavailable). Therefore, when returning to the car, mobile device 201 may determine that the GPS is untrusted when the mobile device is within a predetermined distance of the dead/weak zone.

At block 612, responsive to determining a weak location area, mobile device 201 may supplement GPS location data with mobile device sensor data. For example, the mobile device may use a last known trusted location and supplement it with distance and/or bearing information from mobile device sensors (e.g., pedometer, accelerometer, compass, gyrometer, etc.). The supplemented location data may be displayed on a user interface (similar to block 608) to assist the user in finding her car.

At block 614, mobile device 201 can determine whether it has arrived at the car and/or whether the car is in a transit state. If it is determined that the mobile device arrived at the car and/or that the car is again in a transit state, the location data for the parking spot may be updated (block 616). In some embodiments, the location is disassociated with an identifier for a current parking spot. In some embodiments, a parking history file is maintained and the file is updated to reflect that the car is no longer parked at that particular location.

Figure 7:
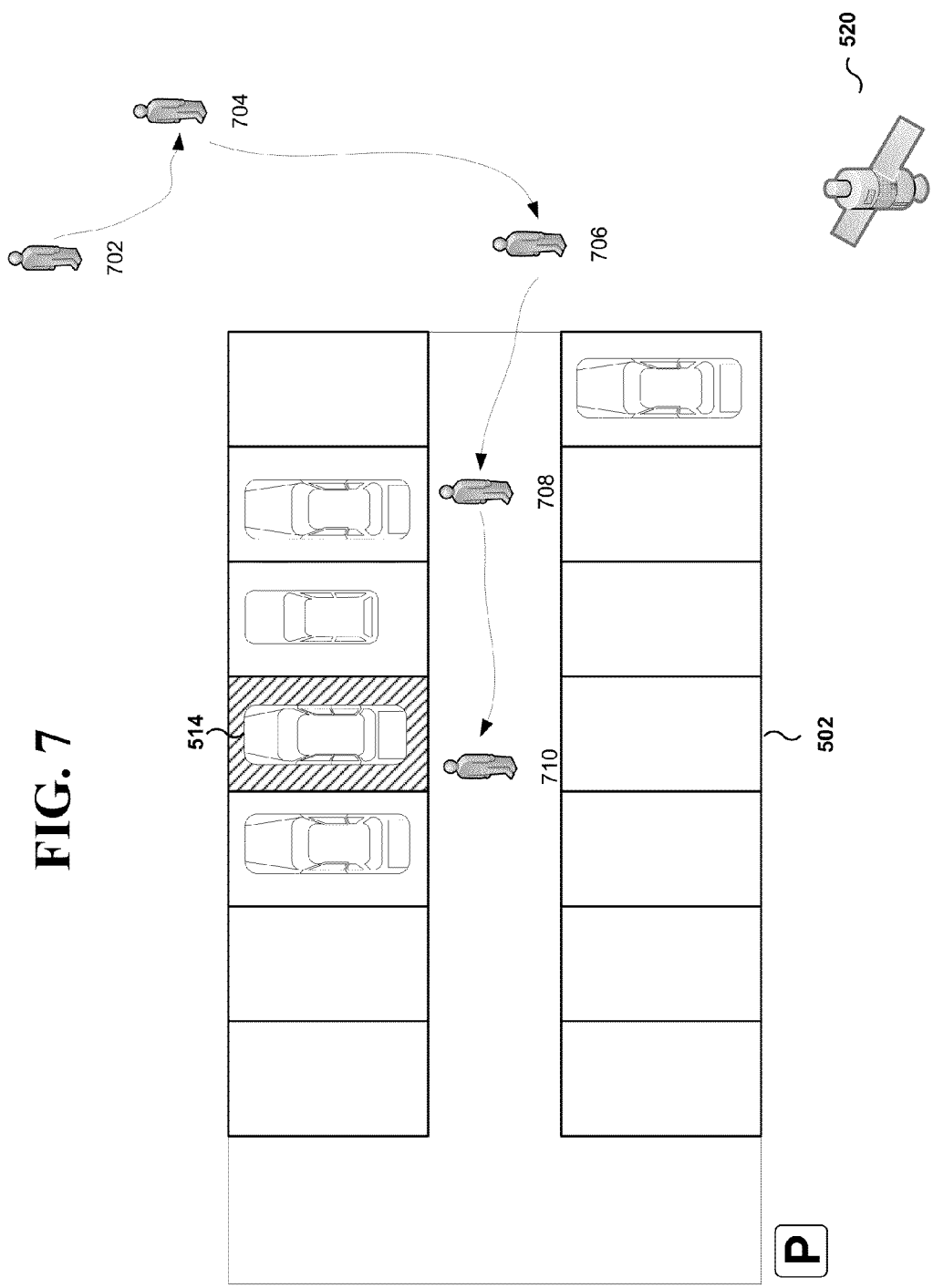
FIG. 7 illustrates an example parking system with a user returning to a parked vehicle according to an embodiment of the present invention.

FIG. 7 illustrates a system 700 with a user returning to a car at a parking area 502. For example, system 700 shows a user returning to the parked car in system 500 (e.g., car 251 is parked at car location 514 within parking area 502).

When the user wants to return to her car, the user provides a user input to mobile device 201 (e.g., block 602 in FIG. 6). Mobile device 201 can retrieve the location of the last known parking spot (e.g., block 604 in FIG. 6). The current location of mobile device 201 may be determined after the instruction is received using a first location technology, such as GPS. In FIG. 7, the location of the mobile device at approximately the time of the user input is shown by user position 702. Based on this, direction information for returning to car 251 may be calculated (e.g., block 606 in FIG. 6).

Then, a user interface for assisting the user in finding car 251 can be displayed on mobile device 201 (e.g., block 608 in FIG. 6). The user may walk to the car location, using the user interface. The location of the user can be determined continuously or periodically as the user walks back to the car location. For example, mobile device 201 may determine that the user is at user position 704 and that the user moved to a user position 706. In the embodiment shown, user positions 702, 704, and 706 can all be determined using the first location technology, such as GPS.

However, mobile device 201 may detect a weak location signal for the first location technology (e.g., block 610 in FIG. 6). For example, mobile device 201 may detect that it is within a predetermined distance of a location where it previously lost or had weak location signals from the first location technology. Responsive to detecting the location signal for the first location technology, mobile device 201 may calculate direction information with first location technology supplemented with mobile device sensor data (e.g., block 612 in FIG. 6).

Using the motion sensor data, the user interface may direct the user to her car. For example, the user may move from user position 706 to user position 708 and from user position 708 to user position 710. In the embodiment shown, user positions 708 and 710 are determined using the first location technology, such as GPS, supplemented with mobile device sensor data. In some embodiments, when the user arrives within a predetermined distance of the car, an alert is generated. In some embodiments, when the user arrives within a predetermined distance of the car, the parking location data is updated. In some embodiments, when mobile device 201 determines that car 251 is in a transit state, the parking location data is updated (e.g., block 616 in FIG. 6).

Figure 8:
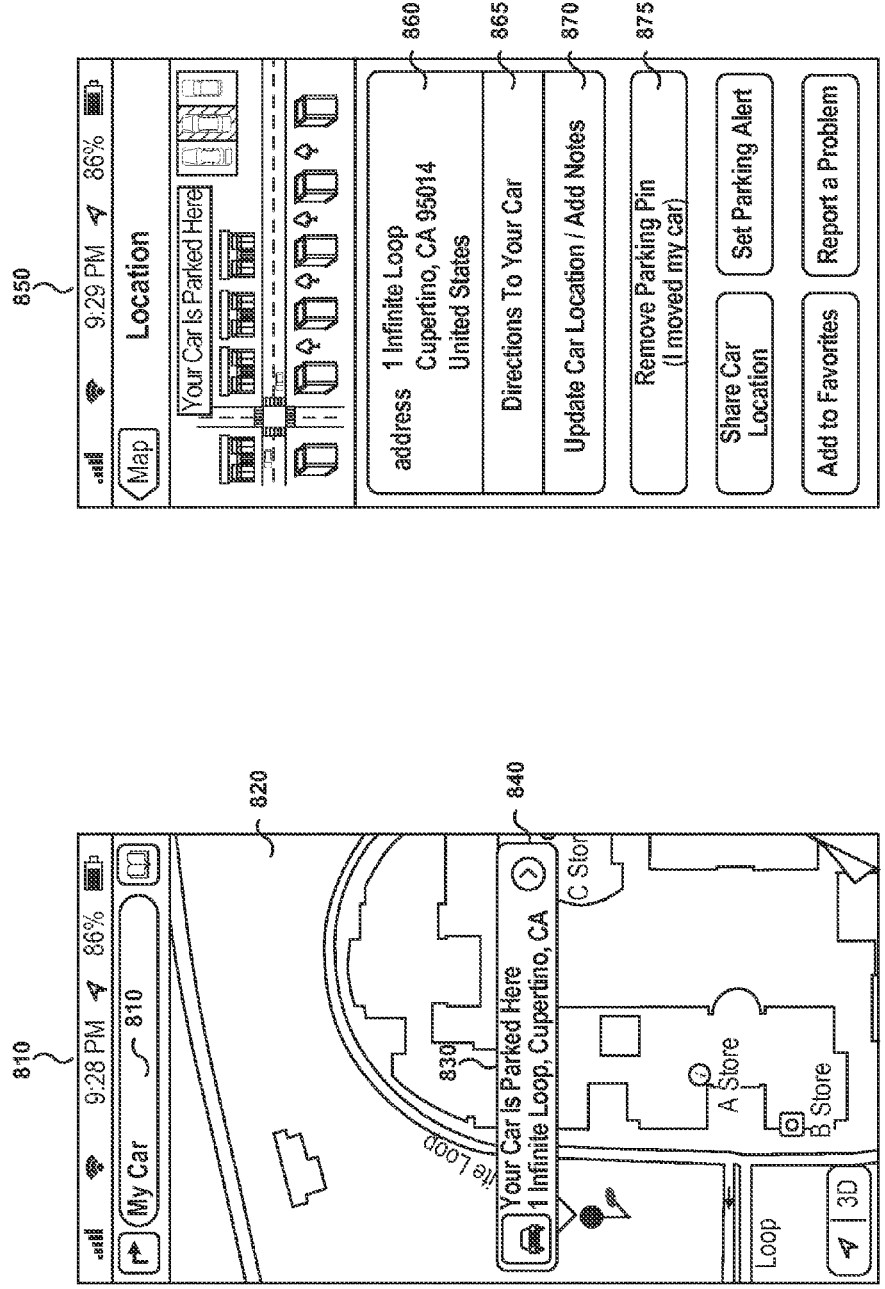
FIGS. 8A and 8B illustrate various sample user interfaces that may be used in accordance with embodiments of the invention.

FIGS. 8A and 8B illustrate various sample user interfaces that may be used in accordance with embodiments of the invention. In particular, FIG. 8A illustrates a user interface 810 for the user to provide a user input to find the user's car. For example, the user could open a maps app and provide a user input to find the user's car (e.g., search for "my car" in data entry field 810). Responsive to the user input, user interface 810 may display the location of the parking spot (830) on a map. Other user interface elements and/or options may be presented (e.g., more information button 840).

User interface 810 is merely an example and one having skill in the art will recognize that there are many other ways for the mobile device to receive user input. For example, a voice command (e.g., using SIRI) can be given by the user to request the location of the user's car.

FIG. 8B shows a user interface 850 that can be displayed responsive to the activation of the button 840 in FIG. 8A (or other suitable use input). User interface 850 may display any suitable information for assisting the user in finding the user's parked car. User interface 850 may include an address associated with parking spot 860. User interface 850 may include a user input option for directions to the car 865 (e.g., a soft key). User interface 850 may include a user input option to update the car location and/or add notes 870, such as a floor level. User interface 850 may include an option to remove a parking pin 875.

Many other options and user interface elements are possible, including options to share the car parking location with another user, set a parking alert (e.g., street cleaning, parking meter expiration, etc.), add parking location to a list of "favorite" parking locations, and the like.

Figure 9:
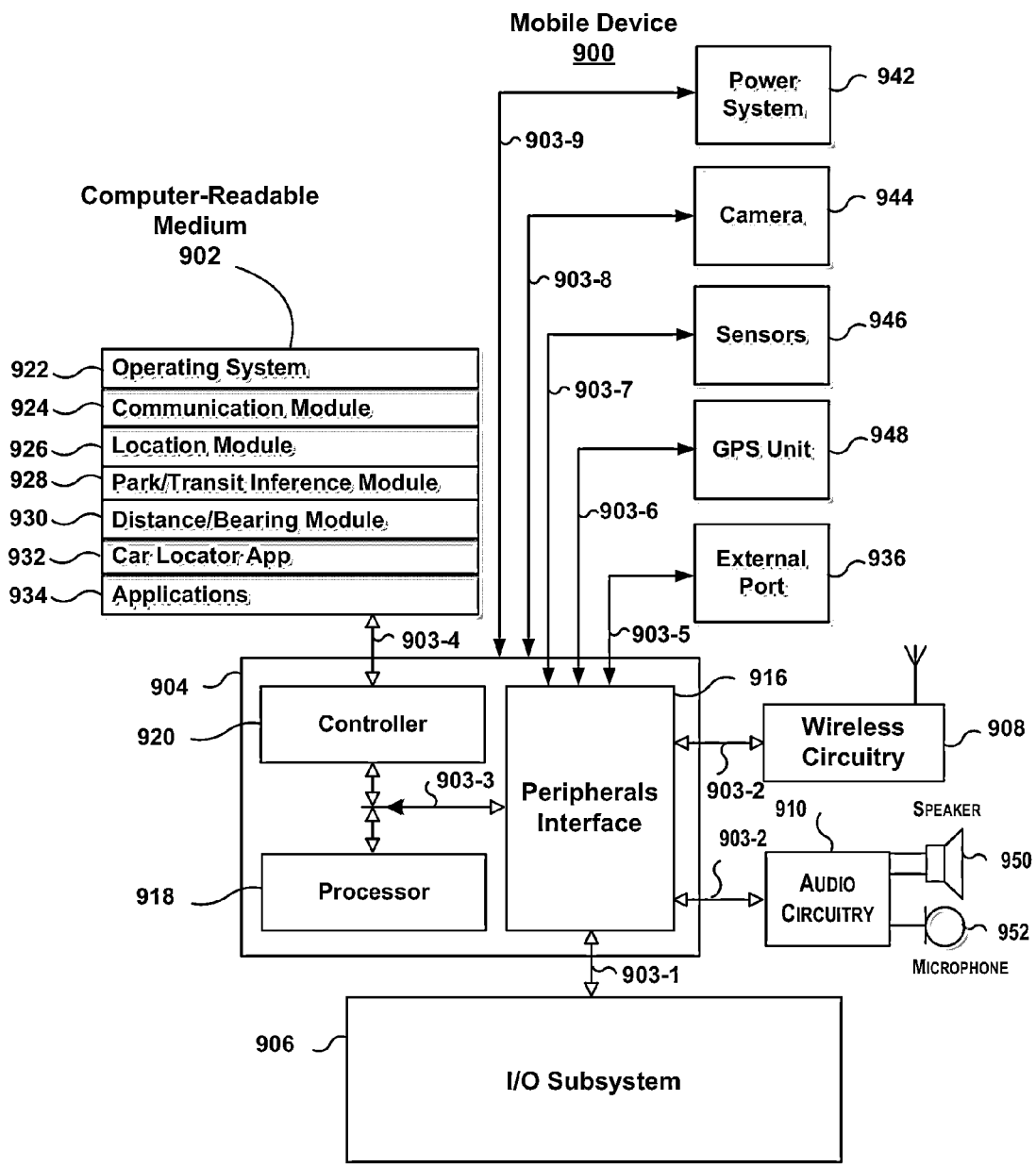
FIG. 9 illustrates a mobile device that can be used according to an embodiment of the present invention.

FIG. 9 is a block diagram of a portable electronic device or mobile device 900 according to an embodiment of the invention. Mobile device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 9 is only one example of an architecture for mobile device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 916, one or more processors 918, and memory controller 920 can be implemented on a single chip, such as processing system 904. In some other embodiments, they can be implemented on separate chips.

Mobile device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 900 includes a camera 944. In some embodiments, mobile device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, mobile device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, a park/transit inference module (or set of instructions) 928, a distance/bearing module (or set of instructions) 930, one or more car locator application (or set of instructions) 932, and other applications (or set of instructions) 934.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 30-pin connector, etc.) is adapted for coupling directly to other devices or indirectly over a network (e.g., the Internet, wireless LAN, etc.).

Location module 926 can assist in determining the current position (e.g., coordinates or other geographic location identifier) of mobile device 900. Modern positioning systems include satellite based positioning systems, such as Global Positioning System (GPS), cellular network positioning based on "cell IDs," and WiFi positioning technology based on a WiFi networks. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, location module 926 receives data from GPS unit 948 and analyzes the signals to determine the current position of the mobile device. In some embodiments, location module 926 can determine a current location using WiFi or cellular location technology. For example, the location of the mobile device can be estimated using knowledge of nearby cell sites and/or WiFi access points with knowledge also of their locations. Information identifying the WiFi or cellular transmitter is received at wireless circuitry 908 and is passed to location module 926. In some embodiments, the location module receives the one or more transmitter IDs. In some embodiments, a sequence of transmitter IDs can be compared with a reference database (e.g., Cell ID database, WiFi reference database) that maps or correlates the transmitter IDs to position coordinates of corresponding transmitters, and computes estimated position coordinates for mobile device 900 based at least in part on the position coordinates of the corresponding transmitters. Regardless of the specific location technology used, location module 926 receives information from which a location fix can be derived, interprets that information, and returns location information, such as geographic coordinates, latitude/longitude, or other location fix data.

Park/transit inference module (or set of instructions) 928 can assist in determining whether a vehicle associated with the mobile device user is in a parked state or a transit state. For example, park/transit inference module may perform one or more of the steps 310, 320, 330, and/or 340 in FIG. 3 to determine whether or not the car is parked or in transit.

Distance/bearing module (or set of instructions) 930 can take various inputs from mobile device sensors and determine distance and/or bearing information based on the sensors. For example, sensors can include an accelerometer and a compass in some embodiments. Based on acceleration and direction values from the accelerometer and the compass, the distance/ bearing module may determine a distance traveled and a direction from a known location (e.g., as determined by the location module 926). The distance and direction information can be used, for example, in marking the location of a parked car or returning to a parked car in a weak location signal scenario.

Car locator app (or set of instructions) 932 may be an application running on the mobile device to assist the user in finding the user's car. For example, it could be a specific app for finding a parked car, a maps application, or any other suitable application.

The one or more applications 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Advantages to certain embodiments of the invention include automatically marking a parking location when it is determined that a car is in a parked state. This can be done without prompting by the user and therefore the user does not have to remember to manually mark a parking location. This improves the user experience and is more convenient for the user.

Further advantages to certain embodiments of the invention include enabling parking location marking in weak location signal scenarios. Some embodiments of the invention permit marking a car's parking location without using transponders in parking areas (e.g., transponder near parking spots) to transmit a unique identifier which can be used to locate a parking spot.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method of identifying a location of a vehicle, the method comprising:
   establishing, with a mobile device, a communication connection with at least one system of the vehicle;
   detecting, with the mobile device, a disconnection of the communication connection;
   responsive to detecting the disconnection, calculating a confidence score based at least in part on sensor data measured from one or more sensors of the mobile device;

responsive to determining that the confidence score exceeds a threshold, determining that the vehicle is in a parked state;

responsive to determining that the vehicle is in a parked state, determining a location of the mobile device; and associating the determined location with the location of the vehicle.

2. The method of claim 1, wherein the communication connection is a short-range wireless connection.

3. The method of claim 1, wherein the communication connection is a wired connection.

4. The method of claim 1 further comprising:

responsive to detecting the disconnection, determining the location of the mobile device.

5. The method of claim 4, wherein location of the mobile device is determined using a global positioning system (GPS).

6. The method of claim 4, wherein location of the mobile device is determined using one or more of WiFi, cellular, or time of flight location technologies.

7. The method of claim 1, wherein calculating the confidence score includes analyzing one or more parameters to weigh the sensor data.

8. The method of claim 7, wherein the one or more parameters include a current speed measured by the mobile device.

9. The method of claim 7, wherein the one or more parameters include a current speed measured by the vehicle.

10. The method of claim 7, wherein the one or more parameters include a motion pattern measured by the mobile device.

11. The method of claim 7, wherein the one or more parameters include navigation data.

12. A computer readable storage medium having program code stored thereon, the program code including instructions that, when executed by a processor in a mobile device, cause the processor to execute a method comprising:

establishing, with a mobile device, a communication connection with at least one system of the vehicle;

detecting, with the mobile device, a disconnection of the communication connection;

responsive to detecting the disconnection, calculating a confidence score based at least in part on sensor data measured from one or more sensors of the mobile device;

responsive to determining that the confidence score exceeds a threshold, determining that the vehicle is in a parked state;

responsive to determining the vehicle is in a parked state, determining a location of the mobile device; and associating the determined location with the location of the vehicle.

13. A method of identifying a location of a parked vehicle, the method comprising:

obtaining, with an electronic device, one or more sensor parameters from a sensor on a mobile device;

detecting, with the mobile device, a disconnection of a communication connection between the mobile device and the vehicle;

responsive to detecting the disconnection, calculating, with the electronic device, a confidence score based on the one or more sensor parameters;

identifying, with the electronic device, the vehicle as being in a parked state based on the confidence score exceeding a threshold;

determining a location of the vehicle at a first time corresponding to when the vehicle is identified as being parked; and associating the determined location with the location of the vehicle when the vehicle is identified to be in the parked state.

14. The method of claim 13, wherein the electronic device is the mobile device, wherein the obtaining includes obtaining a plurality of sensor parameters from one or more sensors of the mobile device, and wherein the calculating includes weighing the plurality of sensor parameters and calculating the confidence score based on the weighted sensor parameters.

15. The method of claim 13, wherein the electronic device is a server in communication with the mobile device.

16. The method of claim 13, wherein the communication connection is a short-range wireless connection between the mobile device and a vehicle system, or a wired connection between the mobile device and a vehicle system.

17. The method of claim 14, wherein the one or more sensor parameters include the location of the mobile device or the location of the mobile device relative to a location of the vehicle.

18. The method of claim 14, wherein the one or more sensor parameters include the measured speed at which the mobile device is traveling.

19. The method of claim 14, wherein the location of the mobile device is determined using distance and bearing data from a known location.

20. The method of claim 19, wherein the known location is a last known location.

21. The method of claim 19, wherein the known location is a next known location after the determination that the vehicle is in a parked state.

22. The method of claim 14, wherein the identifying the vehicle as being in a parked state based on the confidence score exceeding the threshold and the associating the location of the mobile device with a parking location identifier when it is determined that the vehicle is in the parked state occur automatically without interaction of a user.

23. The method of claim 14 further comprising:

disassociating the determined location with the location of the vehicle when it is determined that the vehicle is no longer in the parked state.

24. A computer readable storage medium having program code stored thereon, the program code including instructions that, when executed by a processor in a mobile device, cause the processor to execute a method comprising:

automatically obtaining, with an electronic device, one or more sensor parameters from a sensor on a mobile device;

detecting, with the mobile device, a disconnection of a communication connection between the mobile device and a vehicle;

responsive to detecting the disconnection, calculating, with the electronic device, a confidence score based on the one or more sensor parameters;

identifying, with the electronic device, the vehicle as being in a parked state based on the confidence score exceeding a threshold;

determining a location of the mobile device at a first time corresponding to when the vehicle is identified as being parked; and associating the location of the mobile device with a parking location identifier when the vehicle is identified to be in the parked state.

* * * * *